US012657679B2

(12) United States Patent
Wang et al.

(10) Patent No.:  US 12,657,679 B2
(45) Date of Patent:  Jun. 16, 2026

(54) POWER STATION INSPECTION SYSTEM AND POWER STATION INSPECTION METHOD

(71) Applicant: Huawei Digital Power Technologies Co., Ltd., Shenzhen (CN)

(72) Inventors: Jianqiang Wang, Shanghai (CN); Zhenhuan Shu, Suzhou (CN); Song Wan, Shanghai (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 454 days.

(21) Appl. No.: 18/305,171

(22) Filed: Apr. 21, 2023

(65) Prior Publication Data

US 2023/0260097 A1   Aug. 17, 2023

Related U.S. Application Data

(63) Continuation of application No. PCT/CN2020/122986, filed on Oct. 22, 2020.

(51) Int. Cl.
 *G06T 7/00* (2017.01)
 *B64U 10/00* (2023.01)
 (Continued)

(52) U.S. Cl.
 CPC ............. *G06T 7/0002* (2013.01); *B64U 10/00* (2023.01); *G01J 5/0859* (2013.01);
 (Continued)

(58) Field of Classification Search
 CPC ......... G06T 7/0002; G06T 2207/10032; G06T 2207/10048; G06T 2207/30184;
 (Continued)

(56) References Cited

U.S. PATENT DOCUMENTS

| 2018/0041160 A1* | 2/2018 | Lee | G08C 23/04 |
| 2019/0035146 A1* | 1/2019 | Nowicki | G01S 7/4808 |

(Continued)

FOREIGN PATENT DOCUMENTS

| CN | 105263000 A | 1/2016 | |
| CN | 105981258 A * | 9/2016 | B64F 1/007 |

(Continued)

OTHER PUBLICATIONS

Qingxiao et al., "Operation and Maintenance of Photovoltaic Power Stations," 13th Five-Year Plan Textbook for Energy-related Specialties in Higher Vocational Education, China Railway Publishing House Co., Ltd., total 34 pages (Sep. 30, 2016). With an English translation.

(Continued)

*Primary Examiner* — Huy Q Phan
*Assistant Examiner* — Carl F. R. Tchatchouang
(74) *Attorney, Agent, or Firm* — Leydig, Voit & Mayer, Ltd.

(57) ABSTRACT

A power station inspection system and a power station inspection method are disclosed. A power station inspection system includes an unmanned aerial vehicle, and an unmanned aerial vehicle flight controller, a central controller, and at least two types of data collection terminals that are disposed on the unmanned aerial vehicle. The central controller is configured to control the unmanned aerial vehicle flight controller, so that the unmanned aerial vehicle flight controller controls flight of the unmanned aerial vehicle. The central controller is further configured to control the at least two types of data collection terminals to collect at least two types of component image data of a power station component in a flight process of the unmanned aerial vehicle.

14 Claims, 6 Drawing Sheets

(51) Int. Cl.

| | |
|---|---|
| *B64U 101/26* | (2023.01) |
| *B64U 101/30* | (2023.01) |
| *G01J 5/00* | (2022.01) |
| *G01J 5/08* | (2022.01) |

(52) U.S. Cl.
CPC ...... *B64U 2101/26* (2023.01); *B64U 2101/30* (2023.01); *B64U 2201/00* (2023.01); *G01J 2005/0077* (2013.01); *G06T 2207/10032* (2013.01); *G06T 2207/10048* (2013.01); *G06T 2207/30184* (2013.01)

(58) Field of Classification Search
CPC .......... G06T 7/001; G06T 2207/10036; B64U 10/00; B64U 2101/26; B64U 2101/30; B64U 2201/00; B64U 2201/10; B64U 2101/31; G01J 5/0859; G01J 2005/0077; B64C 39/024; G01N 2021/9518; G01N 21/9515; G01N 21/8851; G01N 2021/8845; G01N 2021/8887; G01N 21/8806; G01N 25/72; G01N 2021/1793; G06V 20/17; H02S 50/15; H02S 50/00
See application file for complete search history.

(56) References Cited

U.S. PATENT DOCUMENTS

| | | | | |
|---|---|---|---|---|
| 2019/0068118 A1* | 2/2019 | Lee | .......................... | H02S 50/15 |
| 2019/0068953 A1* | 2/2019 | Choi | ........................ | G01S 17/89 |
| 2020/0041560 A1* | 2/2020 | Schwartz | ............. | G01R 31/086 |
| 2020/0134318 A1* | 4/2020 | Li | ............................ | H02S 50/15 |
| 2020/0180791 A1* | 6/2020 | Kimberly | .............. | B64D 45/00 |
| 2020/0364456 A1* | 11/2020 | Tran | ...................... | G06T 7/0004 |
| 2021/0126582 A1* | 4/2021 | Shue | ....................... | H02S 50/15 |

FOREIGN PATENT DOCUMENTS

| | | | | | |
|---|---|---|---|---|---|
| CN | 110470279 A | * | 11/2019 | ............. | G01C 11/04 |
| CN | 111522355 A | * | 8/2020 | ............. | G06V 20/13 |

OTHER PUBLICATIONS

Qingxiao et al., "Intelligent Operation and Maintenance Technology for Photovoltaic Power Stations," 13th Five-Year Plan Textbook for Energy-related Specialties in Higher Vocational Education, China Railway Publishing House Co., Ltd., Total 40 pages (Jul. 31, 2020). With an English translation.

* cited by examiner

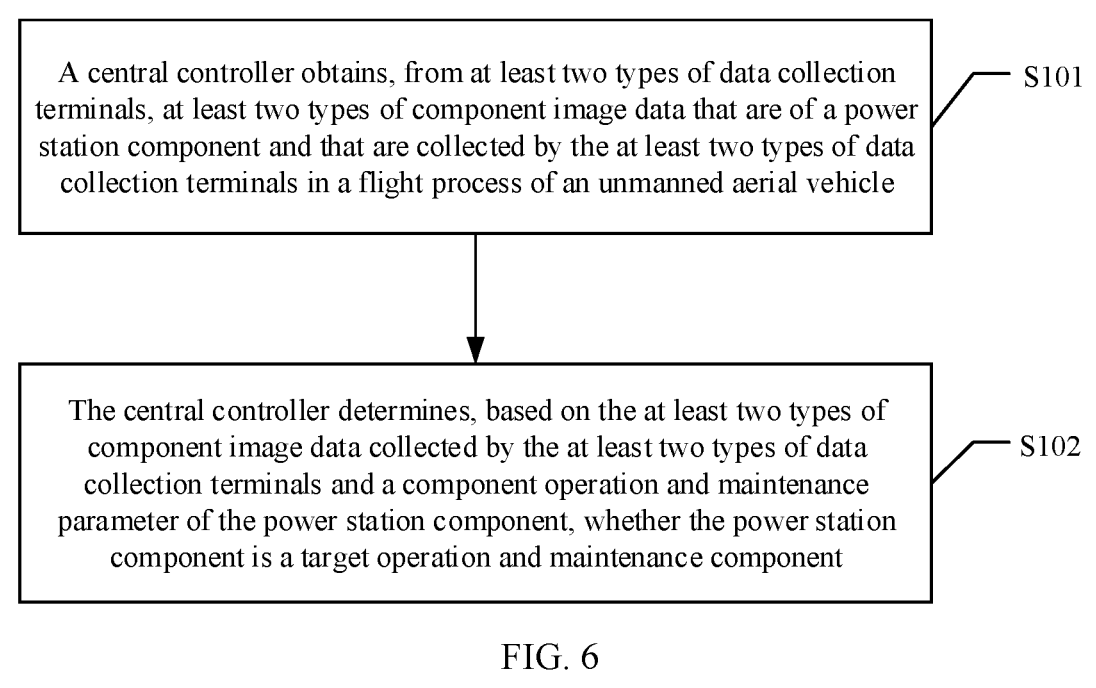

A central controller obtains, from at least two types of data collection terminals, at least two types of component image data that are of a power station component and that are collected by the at least two types of data collection terminals in a flight process of an unmanned aerial vehicle — S101

The central controller determines, based on the at least two types of component image data collected by the at least two types of data collection terminals and a component operation and maintenance parameter of the power station component, whether the power station component is a target operation and maintenance component — S102

FIG. 6

POWER STATION INSPECTION SYSTEM AND POWER STATION INSPECTION METHOD

CROSS-REFERENCE TO RELATED APPLICATION

This application a continuation of International Patent Application No. PCT/CN2020/122986, filed on Oct. 22, 2020, the disclosure of which is hereby incorporated by reference in its entirety.

TECHNICAL FIELD

This application relates to the field of electronics power technologies, and in particular, to a power station inspection system and a power station inspection method.

BACKGROUND

Currently, most photovoltaic power stations are located in remote regions and the stations are scattered, and efficiency of performing manual operation and maintenance on these photovoltaic power stations is low. Therefore, intelligent operation and maintenance have become an inevitable trend of photovoltaic power station development. In a conventional technology, intelligent operation and maintenance are usually performed on a photovoltaic power station through inspection by using an unmanned aerial vehicle (UAV) instead of manual inspection, to quickly and accurately locate a defect and a fault of a component (such as a photovoltaic module). In a current unmanned aerial vehicle architecture, data of a large quantity of photovoltaic modules needs to be transmitted to a ground control station, and a photovoltaic module that requires operation and maintenance is determined by using a station control management system of the ground control station. This is complex to operate, is inefficient, and is of poor applicability.

SUMMARY

This application provides a power station inspection system and a power station inspection method, so that collaborative image data analysis can be performed on at least two types of component image data, and whether a power station component is a target operation and maintenance component can be quickly determined based on a component operation and maintenance parameter. This is easy to operate, efficient, and is of high applicability.

According to a first aspect, this application provides a power station inspection system, where the power station inspection system includes an unmanned aerial vehicle, and an unmanned aerial vehicle flight controller, a central controller, and at least two types of data collection terminals that are disposed on the unmanned aerial vehicle. The central controller is configured to control the unmanned aerial vehicle flight controller, so that the unmanned aerial vehicle flight controller controls flight of the unmanned aerial vehicle. The central controller is further configured to collaboratively control the at least two types of data collection terminals to collect at least two types of component image data of a power station component in a flight process of the unmanned aerial vehicle. The central controller is further configured to determine, based on the at least two types of component image data collected by the at least two types of data collection terminals and a component operation and maintenance parameter of the power station component, whether the power station component is a target operation and maintenance component. The target operation and maintenance component herein may be understood as a component that requires operation and maintenance. In this application, the central controller disposed on the unmanned aerial vehicle may directly perform collaborative image data analysis on the at least two types of component image data, and determine, based on a collaborative image data analysis result and the component operation and maintenance parameter (such as a security risk parameter or an energy yield loss value), whether the power station component is a target operation and maintenance component, without transmitting the at least two types of component image data to a functional module such as a ground control station outside a system for processing. This is easy to operate, has high collaboration efficiency, and has higher applicability.

With reference to the first aspect, in a first possible implementation, the central controller includes a data processing module. The data processing module is configured to determine, based on the at least two types of component image data collected by the at least two types of data collection terminals and the component operation and maintenance parameter of the power station component, whether the power station component is a target operation and maintenance component. The data processing module herein may include a pluggable chip that has a function of providing edge computing power for the central controller, and/or third-party software and/or hardware that have or has a data processing function, and the data processing module may access the central controller based on a mounting requirement (e.g., a communication interface requirement). This is flexible to operate, and facilitates updating or upgrading of the data processing module, and costs are low. In this application, the data processing module directly performs collaborative image data analysis on the at least two types of component image data, and determines, based on an image data analysis result and the component operation and maintenance parameter, whether the power station component is a target operation and maintenance component, without transmitting the at least two types of component image data to a functional module such as a ground control station outside a system for processing. This is easy to operate, has high collaborative image data processing efficiency, and has higher applicability.

With reference to the first possible implementation of the first aspect, in a second possible implementation, the at least two types of data collection terminals include a visible-light data collection terminal and a thermal-infrared data collection terminal, and the at least two types of component image data include visible-light image data and thermal-infrared image data. The data processing module is configured to: when determining, based on the visible-light image data, that the power station component is a faulty component, and determining, based on the thermal-infrared image data, that a test temperature of the power station component is greater than a preset temperature threshold or a component thermal-infrared area is greater than a preset area threshold, determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component. The to-be-operated and maintained component herein may be understood as a power station component that may require operation and maintenance. When the power station component is a to-be-operated and maintained component, a component operation and maintenance parameter of the to-be-operated and maintained component is the component operation and maintenance parameter of the power station component. In this application, the data processing module performs collaborative image data analysis on the visible-light image data and the thermal-infrared image data, to determine whether the power station component has a surface fault and a thermal-infrared fault, so that the power station component having the surface fault and the thermal-infrared fault can be used as the to-be-operated and maintained component. In this case, whether the to-be-operated and maintained component is a target operation and maintenance component may be determined based on the component operation and maintenance parameter of the to-be-operated and maintained component. This is easy to operate, has high collaborative image data processing efficiency, and has higher applicability.

With reference to the first possible implementation of the first aspect, in a third possible implementation, the at least two types of data collection terminals include a visible-light data collection terminal and a short-wave-infrared data collection terminal, and the at least two types of component image data include visible-light image data and short-wave-infrared image data. The data processing module is configured to: when determining, based on the visible-light image data, that the power station component is a faulty component, and determining, based on the short-wave-infrared image data, that a form of the power station component is included in a defect form sample database, determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component. In this application, the data processing module performs collaborative image data analysis on the visible-light image data and the short-wave-infrared image data, to determine whether the power station component has a surface fault and a short-wave-infrared fault, so that the power station component having the surface fault and the short-wave-infrared fault can be used as the to-be-operated and maintained component. In this case, whether the to-be-operated and maintained component is a target operation and maintenance component may be determined based on the component operation and maintenance parameter of the to-be-operated and maintained component. This is easy to operate, has high collaborative image data processing efficiency, and has higher applicability.

With reference to the first possible implementation of the first aspect, in a fourth possible implementation, the at least two types of data collection terminals include a thermal-infrared data collection terminal and a short-wave-infrared data collection terminal, and the at least two types of component image data include thermal-infrared image data and short-wave-infrared image data. The data processing module is configured to: when determining, based on the thermal-infrared image data, that a test temperature of the power station component is greater than a preset temperature threshold or a component thermal-infrared area is greater than a preset area threshold, and determining, based on the short-wave-infrared image data, that a form of the power station component is included in a defect form sample database, determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component. In this application, the data processing module performs collaborative image data analysis on the thermal-infrared image data and the short-wave-infrared image data, to determine whether the power station component has a thermal-infrared fault and a short-wave-infrared fault, so that the power station component having the thermal-infrared fault and the short-wave-infrared fault can be used as the to-be-operated and maintained component. In this case, whether the to-be-operated and maintained component is a target operation and maintenance component may be determined based on the component operation and maintenance parameter of the to-be-operated and maintained component. This is easy to operate, has high collaborative image data processing efficiency, and has higher applicability.

With reference to the first possible implementation of the first aspect, in a fifth possible implementation, the at least two types of data collection terminals include a visible-light data collection terminal, a thermal-infrared data collection terminal, and a short-wave-infrared data collection terminal, and the at least two types of component image data include visible-light component image data, thermal-infrared image data, and short-wave-infrared image data. The data processing module is configured to: when determining, based on the visible-light image data, that the power station component is a faulty component, determining, based on the thermal-infrared image data, that a test temperature of the power station component is greater than a preset temperature threshold or a component thermal-infrared area is greater than a preset area threshold, and determining, based on the short-wave-infrared image data, that a form of the power station component is included in a defect form sample database, determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component. In this application, the data processing module performs collaborative image data analysis on the visible-light component image data, the thermal-infrared image data, and the short-wave-infrared image data, to determine whether the power station component has a surface fault, a thermal-infrared fault, and a short-wave-infrared fault, so that the power station component having the surface fault, the thermal-infrared fault, and the short-wave-infrared fault can be used as the to-be-operated and maintained component. In this case, whether the to-be-operated and maintained component is a target operation and maintenance component may be determined based on the component operation and maintenance parameter of the to-be-operated and maintained component. This is easy to operate, has high collaborative image data processing efficiency, and has higher applicability.

With reference to any one of the second possible implementation of the first aspect to the fifth possible implementation of the first aspect, in a sixth possible implementation, the component operation and maintenance parameter of the to-be-operated and maintained component includes at least one of an energy yield loss value and a security risk parameter of the to-be-operated and maintained component. In this application, the energy yield loss value and the security risk parameter of the to-be-operated and maintained component herein are used to determine whether the to-be-operated and maintained component is a target operation and maintenance component. This is easy to operation, and has high efficiency.

With reference to the sixth possible implementation of the first aspect, in a seventh possible implementation, the component operation and maintenance parameter of the to-be-operated and maintained component includes the energy yield loss value of the to-be-operated and maintained component. The data processing module is further configured to: when the energy yield loss value of the to-be-operated and maintained component is greater than or equal to an energy yield loss threshold, determine that the component operation and maintenance parameter of the to-be-operated and maintained component meets the operation and maintenance condition, and determine the to-be-operated and maintained component as a target operation and maintenance component. The energy yield loss threshold herein may be a manually set value or a default value of the component. In this application, the data processing module may determine, as the target operation and maintenance component, a to-be-operated and maintained component whose energy yield loss value is greater than or equal to the energy yield loss threshold, so that operation and maintenance personnel of a power station perform operation and maintenance processing on the target operation and maintenance component as soon as possible.

With reference to the sixth possible implementation of the first aspect, in an eighth possible implementation, the component operation and maintenance parameter of the to-be-operated and maintained component includes the security risk parameter of the to-be-operated and maintained component. The data processing module is further configured to: when the security risk parameter of the to-be-operated and maintained component is greater than or equal to a security risk threshold, determine that the component operation and maintenance parameter of the to-be-operated and maintained component meets the operation and maintenance condition, and determine the to-be-operated and maintained component as a target operation and maintenance component. The security risk threshold herein may be a manually set value or a default value of the component. In this application, the data processing module may determine, as the target operation and maintenance component, a to-be-operated and maintained component whose security risk parameter is greater than or equal to the security risk threshold, so that operation and maintenance personnel of a power station perform operation and maintenance processing on the target operation and maintenance component as soon as possible.

With reference to any one of the first aspect to the eighth possible implementation of the first aspect, in a ninth possible implementation, the data processing module is further configured to: determine an exception type of the target operation and maintenance component, and generate an operation and maintenance report of the target operation and maintenance component based on the exception type and a component operation and maintenance parameter of the target operation and maintenance component. In the power station inspection system provided in this application, the data processing module may quickly generate the operation and maintenance report of the target operation and maintenance component, so that the operation and maintenance personnel of the power station can view the operation and maintenance report, and update or replace the target operation and maintenance component. This efficient, and is of higher applicability.

With reference to any one of the first aspect to the ninth possible implementation of the first aspect, in a tenth possible implementation, the central controller includes a wireless network communication module or a 5th generation mobile communication technology 5G communication module. In the power station inspection system provided in this application, the wireless network communication module or the 5G communication module may quickly transmit image data and geographical location data of the target operation and maintenance component to the ground control station, so that the operation and maintenance personnel of the power station repair or replace the target operation and maintenance component in a timely manner. This improves power station inspection efficiency and power supply reliability of the power station, and has higher applicability.

With reference to any one of the first aspect to the tenth possible implementation of the first aspect, in an eleventh possible implementation, the central controller is configured to perform independent parallel communication with each data collection terminal in the at least two data collection terminals through a parallel communication interface. In the power station inspection system provided in this application, the central controller may perform independent parallel communication with each data collection terminal, so that synchronous data transmission can be implemented, a transmission speed is high, and efficiency is high.

According to a second aspect, this application provides a power station inspection method. The method is applicable to the central controller in the power station inspection system provided in any one of the first aspect to the eleventh possible implementation of the first aspect. In the method, the central controller obtains, from the at least two types of data collection terminals, at least two types of component image data that are of a power station component and that are collected by the at least two types of data collection terminals in a flight process of the unmanned aerial vehicle; and the central controller determines, based on the at least two types of component image data collected by the at least two types of data collection terminals and a component operation and maintenance parameter of the power station component, whether the power station component is a target operation and maintenance component.

With reference to the second aspect, in a first possible implementation, the at least two types of data collection terminals include a visible-light data collection terminal and a thermal-infrared data collection terminal, and the at least two types of component image data include visible-light image data and thermal-infrared image data. When the central controller determines, based on the visible-light image data, that the power station component is a faulty component, and determines, based on the thermal-infrared image data, that a test temperature of the power station component is greater than a preset temperature threshold or a component thermal-infrared area is greater than a preset area threshold, the central controller determines that the power station component is a to-be-operated and maintained component, determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

With reference to the second aspect, in a second possible implementation, the at least two types of data collection terminals include a visible-light data collection terminal and a short-wave-infrared data collection terminal, and the at least two types of component image data include visible-light image data and short-wave-infrared image data. When the central controller determines, based on the visible-light image data, that the power station component is a faulty component, and determines, based on the short-wave-infrared image data, that a form of the power station component is included in a defect form sample database, the central controller determines that the power station component is a to-be-operated and maintained component, determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

With reference to the second aspect, in a third possible implementation, the at least two types of data collection terminals include a thermal-infrared data collection terminal and a short-wave-infrared data collection terminal, and the at least two types of component image data include thermal-infrared image data and short-wave-infrared image data. When central controller determines, based on the thermal-infrared image data, that a test temperature of the power station component is greater than a preset temperature threshold or a component thermal-infrared area is greater than a preset area threshold, and determines, based on the short-wave-infrared image data, that a form of the power station component is included in a defect form sample database, the central controller determines that the power station component is a to-be-operated and maintained component, determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

With reference to the second aspect, in a fourth possible implementation, the at least two types of data collection terminals include a visible-light data collection terminal, a thermal-infrared data collection terminal, and a short-wave-infrared data collection terminal, and the at least two types of component image data include visible-light component image data, thermal-infrared image data, and short-wave-infrared image data. When the central controller determines, based on the visible-light image data, that the power station component is a faulty component, determines, based on the thermal-infrared image data, that a test temperature of the power station component is greater than a preset temperature threshold or a component thermal-infrared area is greater than a preset area threshold, and determines, based on the short-wave-infrared image data, that a form of the power station component is included in a defect form sample database, the central controller determines that the power station component is a to-be-operated and maintained component, determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

With reference to any one of the first possible implementation of the second aspect to the fourth possible implementation of the second aspect, in a fifth possible implementation, the component operation and maintenance parameter of the to-be-operated and maintained component includes at least one of an energy yield loss value and a security risk parameter of the to-be-operated and maintained component.

With reference to the fifth possible implementation of the second aspect, in a sixth possible implementation, the component operation and maintenance parameter of the to-be-operated and maintained component includes the energy yield loss value of the to-be-operated and maintained component. When the energy yield loss value of the to-be-operated and maintained component is greater than or equal to an energy yield loss threshold, the central controller determines that the component operation and maintenance parameter of the to-be-operated and maintained component meets the operation and maintenance condition, and determines the to-be-operated and maintained component as a target operation and maintenance component.

With reference to the fifth possible implementation of the second aspect, in a seventh possible implementation, the component operation and maintenance parameter of the to-be-operated and maintained component includes the security risk parameter of the to-be-operated and maintained component. When the security risk parameter of the to-be-operated and maintained component is greater than or equal to a security risk threshold, the central controller determines that the component operation and maintenance parameter of the to-be-operated and maintained component meets the operation and maintenance condition, and determines the to-be-operated and maintained component as a target operation and maintenance component.

With reference to any one of the first possible implementation of the second aspect to the seventh possible implementation of the second aspect, in an eighth possible implementation, the central controller determines an exception type of the target operation and maintenance component, and generates an operation and maintenance report of the target operation and maintenance component based on the exception type and a component operation and maintenance parameter of the target operation and maintenance component.

In this application, whether the power station component is a target operation and maintenance component (namely, a power station component that requires operation and maintenance) can be quickly determined. This is easy to operate, efficient, and is of high applicability.

BRIEF DESCRIPTION OF DRAWINGS

FIG. 6 is a schematic flowchart of a power station inspection method according to this application.

DESCRIPTION OF EMBODIMENTS

A power station inspection system provided in this application may also be referred to as an unmanned aerial vehicle inspection system or an unmanned aerial vehicle system. The power station inspection system is applicable to a plurality of application fields such as a power inspection field (e.g., inspection and operation and maintenance are performed on a power station with poor communication or insufficient bandwidth), a monitoring field (e.g., intelligent security protection), an environmental protection field (e.g., environment monitoring, environment law enforcement, and environment improvement), or a reconnaissance field. This may be specifically determined based on an actual application scenario, and is not limited herein.

The power station inspection system provided in this application includes an unmanned aerial vehicle, and an unmanned aerial vehicle flight controller, a central controller, and at least two types of data collection terminals that are disposed on the unmanned aerial vehicle. The central controller is configured to control the unmanned aerial vehicle flight controller, so that the unmanned aerial vehicle flight controller controls flight of the unmanned aerial vehicle. The central controller is further configured to control the at least two types of data collection terminals to collect at least two types of component image data of a power station component in a flight process of the unmanned aerial vehicle. The central controller is further configured to determine, based on the at least two types of component image data collected by the at least two types of data collection terminals and a component operation and maintenance parameter of the power station component, whether the power station component is a target operation and maintenance component. In the power station inspection system provided in this application, the central controller may quickly determine whether the power station component is a target operation and maintenance component. In other words, the central controller may quickly determine a power station component that requires operation and maintenance and a power station component that does not require operation and maintenance in a power station, without transmitting image data of the power station component to a ground control station to determine whether the power station component requires operation and maintenance. This is easy to operate, improves component operation and maintenance efficiency, and has high applicability. The power station inspection system provided in this application may be applied to different application scenarios, for example, a power station inspection scenario or an intelligent security protection scenario. The power station inspection scenario is used as an example for description in this application.

Figure 1:
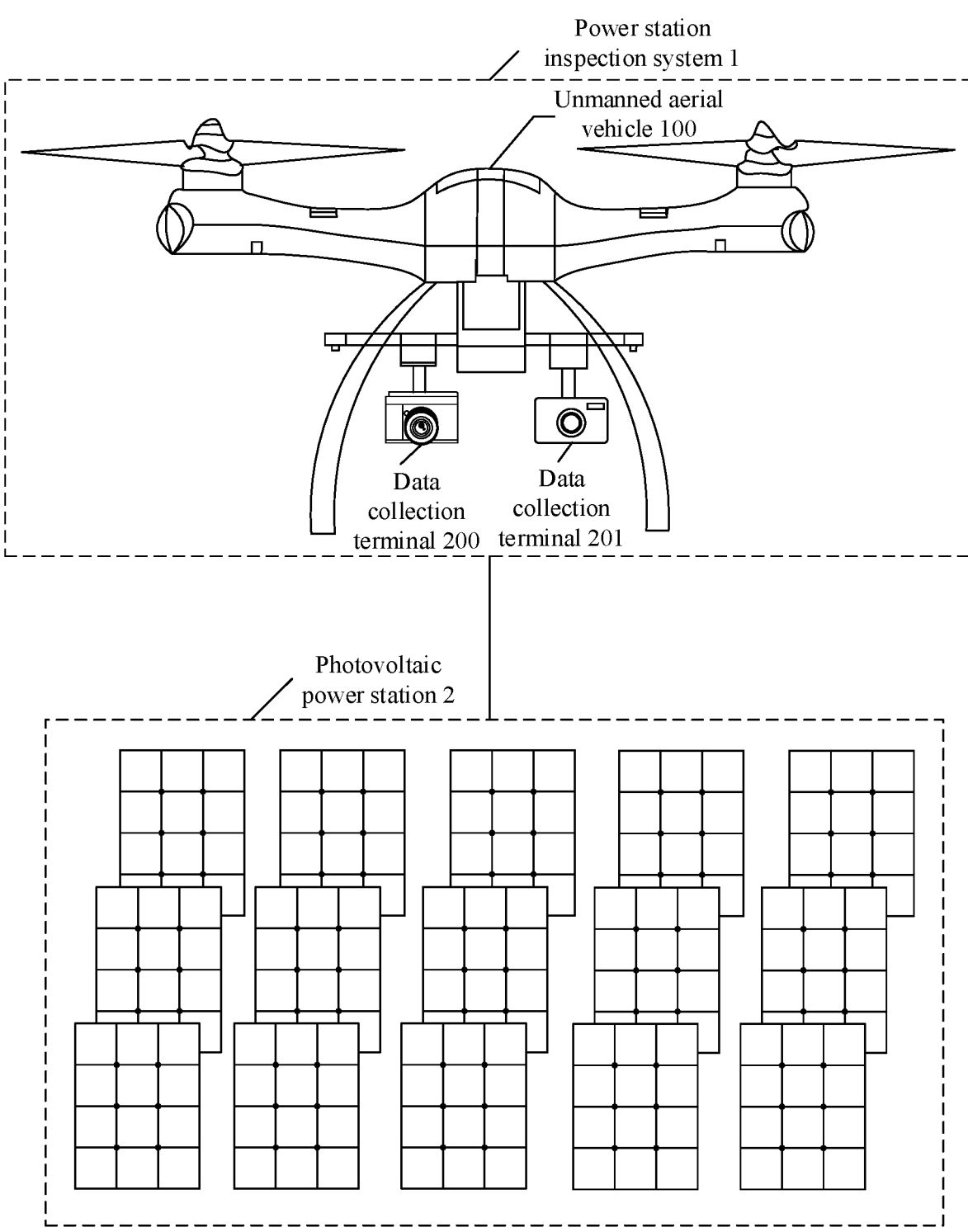
FIG. 1 is a schematic diagram of an application scenario of a power station inspection system according to this application.

FIG. 1 is a schematic diagram of an application scenario of a power station inspection system according to this application. As shown in FIG. 1, a power station inspection system 1 may include an unmanned aerial vehicle (e.g., an unmanned aerial vehicle 100), and an unmanned aerial vehicle flight controller (which may be briefly referred to as an autopilot or a flight control system), a central controller, and at least two types of data collection terminals (e.g., a data collection terminal 200 and a data collection terminal 201) that are disposed on the unmanned aerial vehicle. The unmanned aerial vehicle flight controller and the central controller herein may be hardware devices integrated inside the unmanned aerial vehicle 100, and therefore are not shown in FIG. 1. The data collection terminal 200 or the data collection terminal 201 may be a terminal device having a data collection function. For example, the data collection terminal 200 or the data collection terminal 201 may be a camera device (e.g., a pan-tilt-zoom and/or a camera), a sensor, or another terminal device. The data collection terminal 200 and the data collection terminal 201 herein may include a visible-light data collection terminal and a thermal-infrared data collection terminal, or a visible-light data collection terminal and a short-wave-infrared data collection terminal, or a thermal-infrared data collection terminal and a short-wave-infrared data collection terminal.

The central controller may adapt to a plurality of third-party software and/or hardware interfaces, and may integrate with a plurality of types of third-party software and/or hardware by using the third-party software and/or hardware interfaces, to implement a plurality of functions, for example, perform collaborative image data analysis on at least two types of component image data of a power station component to determine whether the power station component is a to-be-operated and maintained component. Herein, the central controller may also be an integrated module. For example, the central controller may be referred to as a central control module (center control module). A specific function implemented by the central controller and a specific form thereof may be determined based on an actual application scenario. This is not limited herein. The central controller may replace an existing unmanned aerial vehicle flight controller to become a new control center of the unmanned aerial vehicle, to control the unmanned aerial vehicle flight controller, the data collection terminal 200, and the data collection terminal 201. The central controller may control the unmanned aerial vehicle flight controller, so that the unmanned aerial vehicle flight controller accurately senses and calculates flight posture data of the unmanned aerial vehicle 100, to control flight of the unmanned aerial vehicle 100 (e.g., implement precise positioning and hovering and autonomous smooth flight of the unmanned aerial vehicle 100). The central controller may collaboratively control the data collection terminal 200 and the data collection terminal 201 to separately collect at least two types of component image data of a power station component in a flight process of the unmanned aerial vehicle 100 (e.g., a flight process in which the unmanned aerial vehicle 100 inspects a photovoltaic power station 2). For example, the at least two types of component image data may include any two or three of visible-light image data, thermal-infrared image data, and short-wave-infrared image data. This may be specifically determined based on an actual application scenario, and is not limited herein. The power station component herein may be a power transmission tower, a booster tower, a photovoltaic module (which may also be referred to as a solar panel or a photovoltaic panel), another component, or the like. In this application, the central controller may determine, based on the two types of component image data that are of the power station component in the photovoltaic power station 2 and that are collected by the data collection terminal 200 and the data collection terminal 201 and a component operation and maintenance parameter of the power station component, whether the power station component is a target operation and maintenance component, that is, determine a component that requires operation and maintenance in the photovoltaic power station 2. The power station inspection system (e.g., the power station inspection system 1) provided in this application determines, based on the central controller, whether the power station component (e.g., the photovoltaic module in the photovoltaic power station 2) is a target operation and maintenance component, without transmitting the at least two types of component image data of the power station component to a ground control station to determine whether the power station component requires operation and maintenance. This is easy to operate, has high operation and maintenance efficiency, and has higher applicability.

With reference to FIG. 2 to FIG. 5, the following describes, as an example, the power station inspection system provided in this application and a working principle of the power station inspection system.

Figure 2:
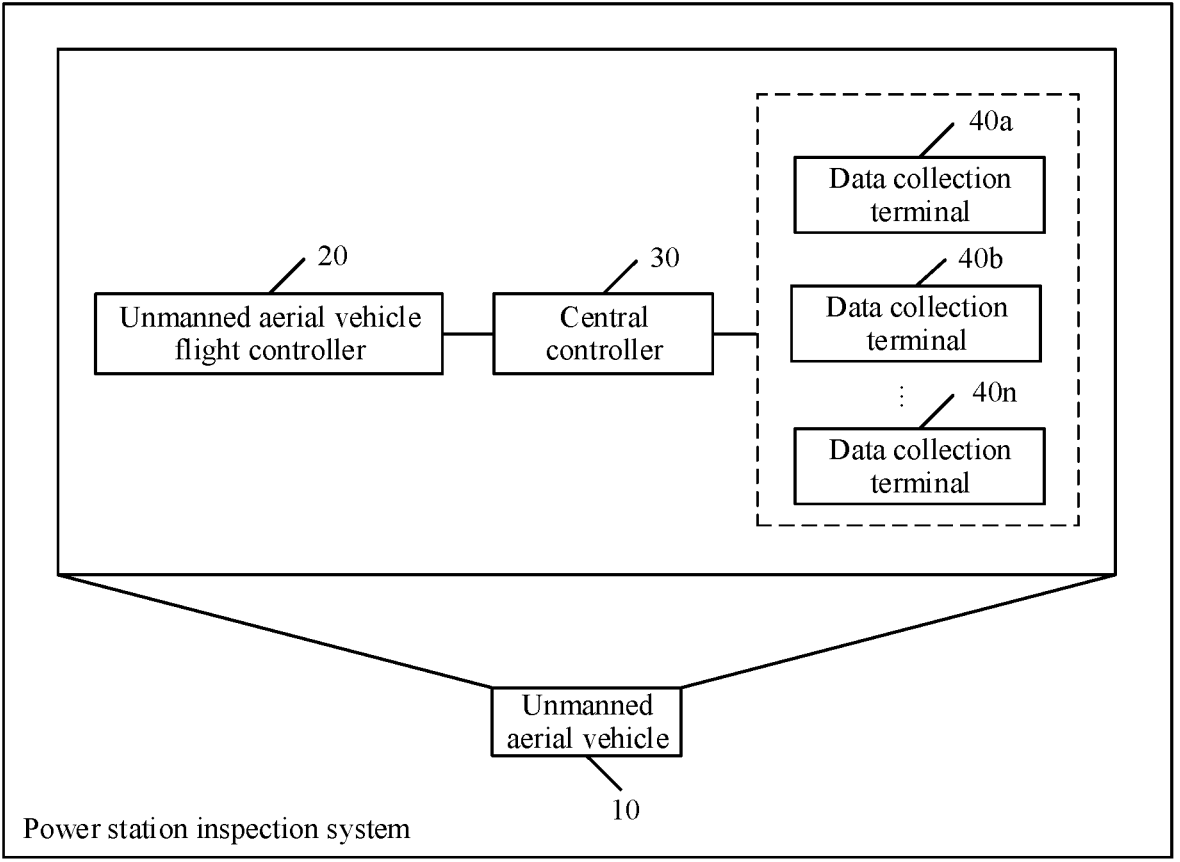
FIG. 2 is a schematic diagram of an architecture of a power station inspection system according to this application.

FIG. 2 is a schematic diagram of an architecture of a power station inspection system according to this application. As shown in FIG. 2, the power station inspection system (e.g., the power station inspection system 1 in FIG. 1) may include an unmanned aerial vehicle (e.g., an unmanned aerial vehicle 10 that is the same as the unmanned aerial vehicle 100 in FIG. 1), and an unmanned aerial vehicle flight controller (e.g., an unmanned aerial vehicle flight controller 20), a central controller (e.g., a central controller 30), and at least two types of data collection terminals (e.g., a data collection terminal 40a to a data collection terminal 40n) that are disposed on the unmanned aerial vehicle. The data collection terminal 40a to the data collection terminal 40n herein may specifically include the data collection terminal 40a (e.g., the foregoing data collection terminal 200), a data collection terminal 40b (e.g., the foregoing data collection terminal 201), . . . , and the data collection terminal 40n. For ease of description, the following is described by using the data collection terminal 40a to the data collection terminal 40n as an example, and details are not described below again.

In some feasible implementations, the central controller 30 is connected to the unmanned aerial vehicle flight controller 20, and the central controller 30 may also be separately connected to the data collection terminal 40a to the data collection terminal 40n. The central controller 30 may implement direct communication (e.g., deliver a control instruction) with the unmanned aerial vehicle flight controller 20 and the data collection terminal 40a to the data collection terminal 40n through a communication interface, and a transmission speed is high. The communication interface herein may be a parallel communication interface or a serial communication interface, for example, a serial bus (USB) communication interface, a gigabit Ethernet (GE) communication interface, an asynchronous transfer standard interface (recommended standard 232, which may be briefly referred to as an RS232 communication interface), or another communication interface. The RS232 communication interface may also be referred to as an EIA-RS232 (electronic industries association-recommended standard 232) communication interface or a 232 communication interface. Optionally, wireless communication may also be performed between the unmanned aerial vehicle flight controller 20, the central controller 30, and the data collection terminal 40a to the data collection terminal 40n. This can reduce communication wiring, reduce a mounting requirement, and has higher applicability. It should be noted that a connection relationship between the unmanned aerial vehicle flight controller 20, the central controller 30, and the data collection terminal 40a to the data collection terminal 40n may be specifically determined based on an actual application scenario. This is not limited herein.

Generally, the unmanned aerial vehicle flight controller 20 may include parts such as a main control unit, an inertial measurement unit (IU), a global positioning system (GPS) compass unit (the GPS compass unit herein may include a GPS unit and a compass unit), and a light emitting diode (LED) indicator unit. The main control unit is a core of the unmanned aerial vehicle flight controller 20. Devices such as the inertial measurement unit, the GPS compass, a steering gear, and a remote control receiver may be connected to the unmanned aerial vehicle flight controller 20 by using the main control unit, to implement an autonomous flight function of the unmanned aerial vehicle 10. In addition, the main control unit may further record flight data of the unmanned aerial vehicle 10, and the main control unit may further adjust a flight parameter through a communication interface (e.g., a USB interface). The inertial measurement unit may generally include a three-axis accelerometer, a three-axis angular velocity meter, and a barometric altimeter, and may sense a flight posture, a flight angle, a flight speed, and a flight height of the unmanned aerial vehicle 10 with high precision by using the three-axis accelerometer, the three-axis angular velocity meter, and the barometric altimeter. The GPS compass unit may be configured to precisely determine a direction, a longitude, and a latitude of the unmanned aerial vehicle 10, so that functions such as automatic return of the unmanned aerial vehicle for out-of-control protection and precise positioning and hovering of the unmanned aerial vehicle can be implemented. The LED indicator unit may be configured to display a flight status of the unmanned aerial vehicle 10 in real time. Therefore, the central controller 30 may deliver a flight control instruction to the unmanned aerial vehicle flight controller 20, so that the unmanned aerial vehicle flight controller 20 controls flight of the unmanned aerial vehicle 10 by using the main control unit, the inertial measurement unit, the GPS compass unit, and the LED indicator unit in the unmanned aerial vehicle flight controller 20, and the unmanned aerial vehicle 10 comprehensively inspects a power station (e.g., the photovoltaic power station 2).

The data collection terminal 40a to the data collection terminal 40n each may be a camera device, a sensor, or another terminal device. The camera device herein may be a visible-light camera, a thermal-infrared dual-light camera, an electroluminescence (EL) camera, or another camera device. The EL camera may also be referred to as a short-wave-infrared camera. The central controller 30 may deliver a data collection control instruction to the unmanned aerial vehicle flight controller 20, to control the data collection terminal 40a to the data collection terminal 40n to collect (e.g., photograph) n types of component image data of a power station component in real time in a flight process of the unmanned aerial vehicle 10, where n is a positive integer greater than or equal to 2. For ease of description, the following is described by using an example in which the power station component is a photovoltaic module (e.g., the photovoltaic module in the photovoltaic power station 2). For example, if the data collection terminal 40a is a visible-light camera, the visible-light camera may obtain visible-light image data of the photovoltaic module through photographing. If the data collection terminal 40b is a thermal-infrared dual-light camera, the thermal-infrared dual-light camera may obtain thermal-infrared image data of the photovoltaic module through photographing. If the data collection terminal 40n is an EL camera, the EL camera may obtain short-wave-infrared image data of the photovoltaic module through photographing.

The central controller 30 may determine, based on at least two types of component image data that are of the power station component and that are collected by the data collection terminal 40a to the data collection terminal 40n and a component operation and maintenance parameter of the power station component, whether the power station component is a target operation and maintenance component. It may be understood that, the central controller 30 may directly invoke the n types of component image data that are of the power station component and that are collected by the data collection terminal 40a to the data collection terminal 40n, and determine, based on the n types of component image data of the power station component and the component operation and maintenance parameter of the power station component, whether the power station component is a target operation and maintenance component, or the central controller 30 may first store the n types of component image data of the power station component, and determines, based on the n types of component image data of the power station component and the component operation and maintenance parameter of the power station component, whether the power station component is a target operation and maintenance component. The unmanned aerial vehicle flight controller 20, the central controller 30, and the data collection terminal 40a to the data collection terminal 40n may be independent of each other. Optionally, the unmanned aerial vehicle flight controller 20 may be integrated into the central controller 30, or the central controller 30 may control the unmanned aerial vehicle flight controller 20 by integrating third-party software (e.g., unmanned aerial vehicle flight control software), so that adaptability is higher.

In some feasible implementations, the central controller (e.g., the central controller 30) performs independent parallel communication with each data collection terminal in the data collection terminal 40a to the data collection terminal 40n through a parallel communication interface. In this application, a pan-tilt-zoom and a camera mounted on the pan-tilt-zoom may be collectively referred to as a data collection terminal. Alternatively, in this application, a pan-tilt-zoom or a camera may be separately referred to as a data collection terminal. It may be understood that the central controller 30 may directly perform independent parallel communication with each data collection terminal in the data collection terminal 40a to the data collection terminal 40n, so that synchronous data transmission is implemented, a transmission speed is high, and efficiency is high. Optionally, the central controller 30 may also perform serial communication with each data collection terminal in the data collection terminal 40a to the data collection terminal 40n through a serial communication interface (e.g., the RS232 communication interface), so that direct communication can be performed with each data collection terminal, and efficiency is high. It should be noted that a communication manner between the central controller and the data collection terminal 40a to the data collection terminal 40n may be specifically determined based on an actual application scenario. This is not limited herein.

Figure 3:
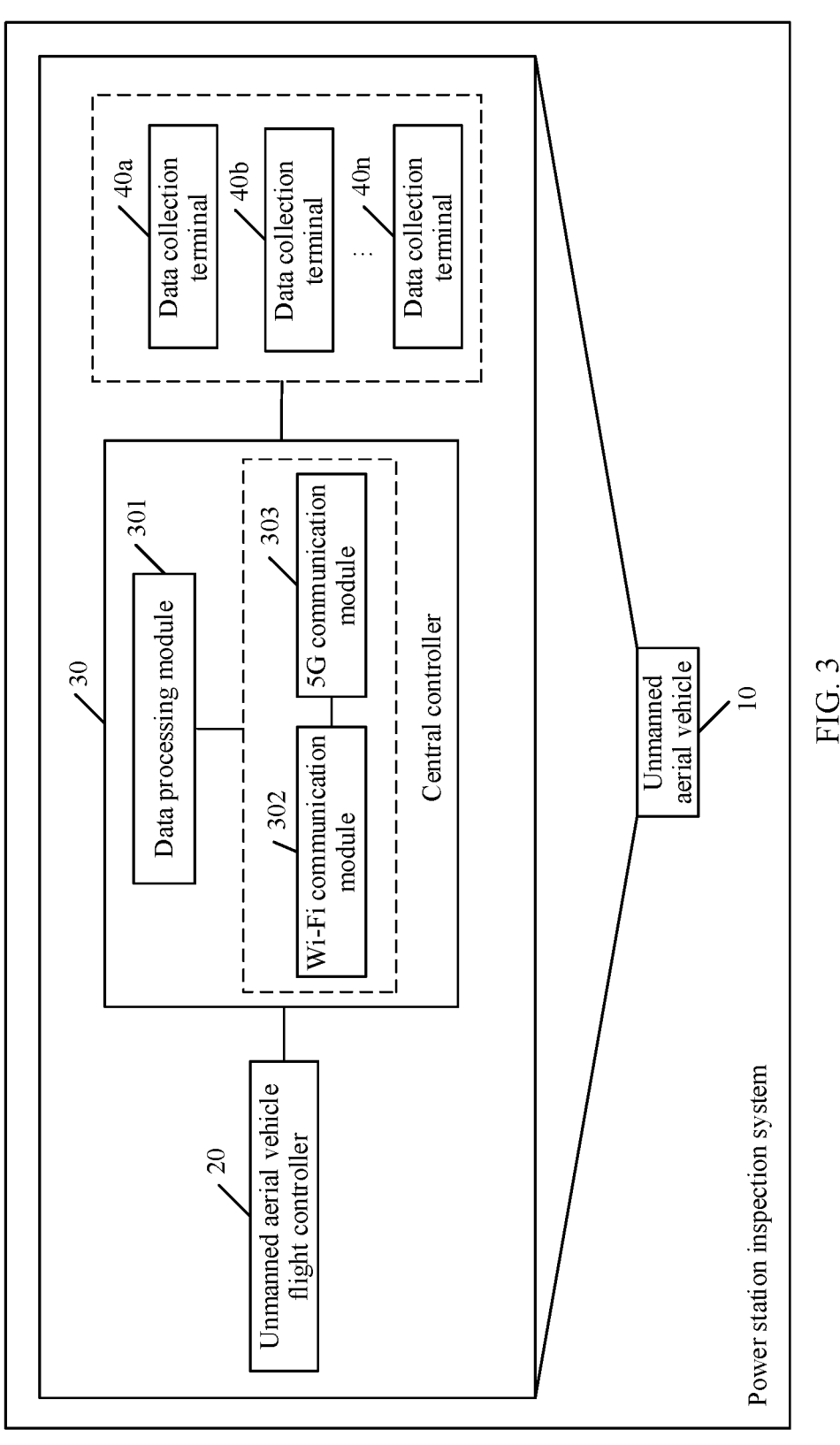
FIG. 3 is a schematic diagram of another architecture of a power station inspection system according to this application.

FIG. 3 is a schematic diagram of another architecture of a power station inspection system according to this application.

In some feasible implementations, the central controller 30 shown in FIG. 2 may include a data processing module (e.g., a data processing module 301), and the data processing module 301 is configured to determine, based on the n types of component image data that are of the power station component and that are collected by the data collection terminal 40a to the data collection terminal 40n and the component operation and maintenance parameter of the power station component, whether the power station component is a target operation and maintenance component. The data processing module 301 may be a chip (which may be briefly referred to as an edge computing chip, for example, an Ascend 310 chip) that has a function of providing edge computing power for the central controller 30, and/or third-party software and/or hardware (e.g., image processing software, fault identification software, and edge computing software) that have or has a data processing function. The data processing module 301 may directly perform, by using the edge computing chip and/or the software and/or hardware that have or has a data processing function, edge computing processing on the n types of component image data that are of the power station component and that are collected by the data collection terminal 40a to the data collection terminal 40n, and determine, based on an edge computing processing result and the component operation and maintenance parameter of the power station component, whether the power station component is a target operation and maintenance component. It can be learned that edge computing can accelerate data stream processing. Therefore, the data processing module 301 can collaboratively process data without a delay, to improve collaborative image data processing efficiency. In addition, the central controller 30 does not need to transmit the n types of component image data of the power station component to the ground control station for data processing. This is applicable to an application scenario in which a power station has poor communication or insufficient bandwidth, has high collaborative data processing efficiency, and has higher applicability. When an operation and maintenance requirement of the power station increases, the central controller 30 may be upgraded or iteratively developed. For example, a new edge computing chip may be iteratively developed, or an original edge computing chip may be upgraded, or a third-party software and/or hardware interface in the central controller may be upgraded and replaced. In this way, the entire unmanned aerial vehicle does not need to be replaced when the operation and maintenance requirement increases, so that costs are low, and applicability is higher.

In some feasible implementations, the data collection terminal 40a to the data collection terminal 40n may include two types of data collection terminals such as a visible-light data collection terminal (e.g., the data collection terminal 40a) and a thermal-infrared data collection terminal (the data collection terminal 40b). The n types of component image data may include two types of component image data such as visible-light image data and thermal-infrared image data. It may be understood that the visible-light image data herein may directly show some surface faults of the power station component, to help subsequently quickly determine whether the power station component is a faulty component. The thermal-infrared image data may show a temperature and distribution of each part of the power station component. A different temperature or thermal-infrared area (such as a region area) of each part of the power station component may be determined based on regions with different colors in the thermal-infrared image data, to help subsequently determine a test temperature or a component thermal infrared area of the power station component directly, to further determine, based on the test temperature or the component thermal-infrared area, whether the power station component has a thermal-infrared fault. The data processing module 301 is configured to: determine, based on the visible-light image data, whether the power station component has a surface fault, and when the power station component has a surface fault, determine that the power station component is a faulty component. In addition, the data processing module 301 may also be configured to determine the test temperature or the thermal-infrared area of the power station component based on the thermal-infrared image data, and if the test temperature is greater than a preset temperature threshold or the thermal-infrared area is greater than a threshold area threshold, determine that the power station component has a thermal-infrared fault (e.g., a hot spot). The preset temperature threshold or the threshold area threshold herein may be a default value (namely, a default value that is set when the power station component is delivered from the factory). The preset temperature threshold is used as an example for description. For example, the preset temperature threshold may be 30 degrees Celsius or another temperature value. Generally, a test temperature of a faulty power station component is about 10 degrees Celsius or another temperature value higher than the preset temperature threshold. Further, when the power station component is a faulty component and the power station component has a thermal-infrared fault, the data processing module 301 determines that the power station component is a to-be-operated and maintained component, determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component. The to-be-operated and maintained component in this application may be understood as a power station component that may require operation and maintenance. When the power station component is a to-be-operated and maintained component, a component operation and maintenance parameter of the to-be-operated and maintained component is the component operation and maintenance parameter of the power station component. In this application, a condition used to determine that the to-be-operated and maintained component requires operation and maintenance may be collectively referred to as an operation and maintenance condition.

It is assumed that the power station component is a photovoltaic module. The data processing module 301 may perform image data analysis on visible-light image data of the photovoltaic module, so that a surface fault (e.g., whether a surface of the photovoltaic module is damaged or stained) of the photovoltaic module can be checked quickly and conveniently. When the photovoltaic module has a surface fault, the data processing module 301 determines that the photovoltaic module is a faulty component, and may further output an exception alarm of the photovoltaic module in a timely manner. This improves power supply reliability of the photovoltaic module. It is assumed that the power station component is a power transmission tower. The data processing module 301 may perform image data analysis on visible-light image data of the power transmission tower, so that a surface fault (e.g., a case in which a pin at a connection location of insulators of the power transmission tower is intact) of the power transmission tower can be checked quickly and conveniently. When the power transmission tower has a surface fault, the data processing module 301 determines that the power transmission tower is a faulty component, and may further output an exception alarm of the power transmission tower in a timely manner. This eliminates a loose connection and a potential sparking risk. It is assumed that the power station component is a booster tower. The data processing module 301 may perform image data analysis on visible-light image data of the booster tower, so that a surface fault (e.g., oil leakage of a transformer in the booster tower) of the booster tower can be checked. When the booster tower has a surface fault, the data processing module 301 determines that the booster tower is a faulty component, and may further output an exception alarm of the booster tower in a timely manner. This eliminates a potential accident risk. It is assumed that the power station component is a photovoltaic module. When the photovoltaic module is shaded, a temperature or a thermal-infrared area of a shaded part of the photovoltaic module is far greater than a temperature or a thermal-infrared area (e.g., 0) of an unshaded part of the photovoltaic module, to form a hot spot of the photovoltaic module. In this case, the data processing module 301 may determine a test temperature (e.g., the temperature of the shaded part of the photovoltaic module) or a thermal-infrared area of the photovoltaic module from thermal-infrared image data of the photovoltaic module. If detecting that the test temperature (e.g., 40 degrees Celsius) is greater than the preset temperature threshold (e.g., 30 degrees Celsius) or the thermal-infrared area is greater than the preset area threshold, the data processing module 301 determines that the photovoltaic module is a photovoltaic module having a hot spot. It is assumed that the power station component is a power transmission tower and/or a booster tower. The data processing module 301 may determine, from thermal-infrared image data of the power transmission tower and/or the booster tower, a test temperature (which may be, for example, a temperature of a power transmission device in the power transmission tower and/or a temperature of each connection point in the booster tower) or a thermal-infrared area of the power transmission tower and/or the booster tower. If detecting that the test temperature is greater than the preset temperature threshold or the thermal-infrared area is greater than the preset area threshold, the data processing module 301 determines that the power transmission tower and/or the booster tower have or has a thermal-infrared fault. Further, when the photovoltaic module and/or the power transmission tower and/or the booster tower are/is a faulty component, and the photovoltaic module and/or the power transmission tower and/or the booster tower have/has a thermal-infrared fault, the data processing module 301 determines that the photovoltaic module and/or the power transmission tower and/or the booster tower are/is a to-be-operated and maintained component, and determines, when a component operation and maintenance parameter of the to-be-operated and maintained component meets the operation and maintenance condition, that the to-be-operated and maintained component is a target operation and maintenance component.

Optionally, the data processing module 301 is further configured to determine, based on the visible-light image data, whether the power station component has a surface fault, and when the power station component does not have a surface fault, determine that the power station component is a normal component. In addition, the data processing module 301 is further configured to: when detecting that the test temperature of the power station component is less than or equal to the preset temperature threshold, or the component thermal-infrared area is less than or equal to the preset area threshold, determine that the power station component has no thermal-infrared fault. Further, when the power station component is a normal component and the power station component has no thermal-infrared fault, the data processing module 301 determines that operation and maintenance do not need to be performed on the power station component, that is, the power station component is a normal component.

In some feasible implementations, the data collection terminal 40a to the data collection terminal 40n may include two types of data collection terminals such as a visible-light data collection terminal (e.g., the data collection terminal 40a) and a short-wave-infrared data collection terminal (the data collection terminal 40n). The n types of component image data may include two types of component image data such as visible-light image data and short-wave-infrared image data. It may be understood that the short-wave-infrared image data may show a defect form of the power station component, to help subsequently determine that the power station component has a target defect. The data processing module 301 is configured to: determine, based on the visible-light image data, whether the power station component has a surface fault, and when the power station component has a surface fault, determine that the power station component is a faulty component. In addition, the data processing module 301 may also be configured to determine a form of the power station component based on the infrared image data, and if the form of the power station component is included in a defect form sample database, determine that the power station component has a target defect. The defect sample database herein may be a sample database that is pre-stored in the data processing module 301 and that includes the defect form of the power station component, or the data processing module 301 may directly invoke a defect form sample database of the power station component in third-party software. The defect sample database may include sample data of a plurality of defect forms of the power station component (such as the photovoltaic module and/or the power transmission tower and/or the booster tower). Specifically, the data processing module 301 is configured to: determine a form (the form herein may be a defect form or a normal component form) of the power station component based on the short-wave-infrared image data, match the form of the power station component and the plurality of defect forms in the defect form sample database, and if a target defect form matching the form of the power station component is obtained from the plurality of defect forms through matching, determine that the form of the power station component is included in the defect form sample database, and determine that the power station component has a target defect corresponding to the target defect form, that is, the power station component is a power station component having a target defect. It may be understood that, the data processing module 301 is further configured to: when a matching degree (namely, a similarity, for example, 80% or another value) between the form of the power station component and a defect form is greater than a matching degree threshold, determine that the defect form is a target defect form that matches the form of the power station component. The matching degree threshold herein may be a manually set value or a default value. Further, when the power station component is a faulty component and the power station component has a target defect, the data processing module 301 is configured to: determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component.

Figure 4:
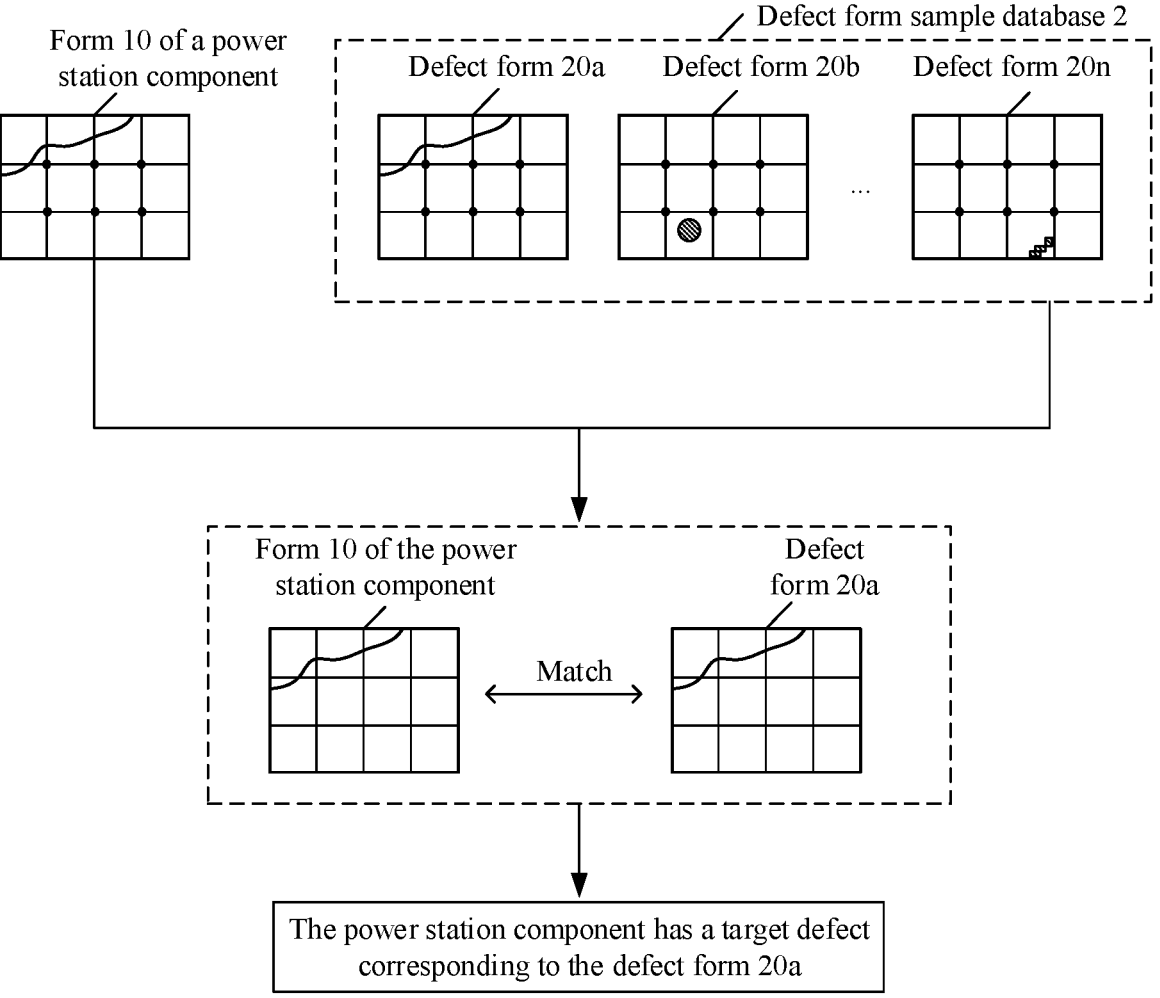
FIG. 4 is a schematic diagram of an application scenario of short-wave-infrared image data according to this application.

It is assumed that the power station component is a photovoltaic module. The data processing module 301 may perform image data analysis on visible-light image data of the photovoltaic module, so that a surface fault (e.g., whether a surface of the photovoltaic module is damaged or stained) of the photovoltaic module can be checked quickly and conveniently. When the photovoltaic module has a surface fault, the data processing module 301 determines that the photovoltaic module is a faulty component. For ease of description, the plurality of defect forms in the defect form sample database are described by using a defect form of the photovoltaic module as an example. The plurality of defect forms may include: a hidden crack defect form, a fragment defect form, a poor soldering defect form, a grid breaking defect form, a bypass diode defect form (a defect form caused by a bypass diode fault in the photovoltaic module), a hot spot defect form (that is, a physical damage exists inside the photovoltaic module), another defect form, or the like. FIG. 4 is a schematic diagram of an application scenario of short-wave-infrared image data according to this application. As shown in FIG. 4, the defect form sample database (e.g., a defect form sample database 2) may include a plurality of defect forms (e.g., a defect form 20a to a defect form 20n). For ease of description, the foregoing plurality of defect forms are described by using the defect form 20a to the defect form 20n as an example. The defect form 20a may be a hidden crack defect form, the defect form 20b may be a hot spot defect form, . . . , and the defect form 20n may be a bypass diode defect form. After determining a form (e.g., a form 10 of the photovoltaic module) of the photovoltaic module based on short-wave-infrared image data, the data processing module 301 may separately match the form 10 of the photovoltaic module and the defect form 20a to the defect form 20n, to obtain a target defect form (e.g., the defect form 20a) that matches the form 10 of the photovoltaic module, that is, the photovoltaic module has a target defect (e.g., the hidden crack defect) corresponding to the defect form 20a. In other words, the photovoltaic module is a component having a hidden crack defect. Further, when the photovoltaic module is a faulty component and the photovoltaic module has a hidden crack defect, the data processing module 301 determines that the photovoltaic module is a to-be-operated and maintained component, and determines, when a component operation and maintenance parameter of the to-be-operated and maintained component meets an operation and maintenance condition, that the to-be-operated and maintained component is a target operation and maintenance component.

Optionally, the data processing module 301 is further configured to determine, based on the visible-light image data, whether the power station component has a surface fault, and when the power station component does not have a surface fault, determine that the power station component is a normal component. In addition, the data processing module 301 is further configured to: if no target defect form matching the form of the power station component is found in the plurality of defect forms, determine that the form of the power station component is not included in the defect form sample database, to further determine that the power station component has no defect. Further, when the power station component is a normal component and the power station component has no defect, the data processing module 301 determines that operation and maintenance do not need to be performed on the power station component, that is, the power station component is a normal component.

In some feasible implementations, the data collection terminal 40a to the data collection terminal 40n may include two types of data collection terminals such as a thermal-infrared data collection terminal (the data collection terminal 40*b*) and a short-wave-infrared data collection terminal (the data collection terminal 40*n*). The n types of component image data may include two types of component image data such as thermal-infrared image data and short-wave-infrared image data. The data processing module 301 may also be configured to determine the test temperature or the thermal-infrared area of the power station component based on the thermal-infrared image data, and if the test temperature is greater than a preset temperature threshold or the thermal-infrared area is greater than a threshold area threshold, determine that the power station component has a thermal-infrared fault (e.g., a hot spot). In addition, the data processing module 301 may also be configured to determine a form of the power station component based on the infrared image data, and if the form of the power station component is included in a defect form sample database, determine that the power station component has a target defect. Further, when the power station component has a thermal-infrared fault and the power station component has a target defect, the data processing module 301 is configured to: determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component.

Optionally, the data processing module 301 is further configured to determine, based on the visible-light image data, whether the power station component has a surface fault, and when the power station component does not have a surface fault, determine that the power station component is a normal component. In addition, the data processing module 301 is further configured to: if no target defect form matching the form of the power station component is found in the plurality of defect forms, determine that the form of the power station component is not included in the defect form sample database, to further determine that the power station component has no defect. Further, when the power station component has no thermal-infrared fault and the power station component has no defect, the data processing module 301 determines that operation and maintenance do not need to be performed on the power station component, that is, the power station component is a normal component.

In some feasible implementations, the data collection terminal 40*a* to the data collection terminal 40*n* may include three types of data collection terminals such as a visible-light data collection terminal (e.g., the data collection terminal 40*a*), a thermal-infrared data collection terminal (the data collection terminal 40*b*), and a short-wave-infrared data collection terminal (the data collection terminal 40*n*). The n types of component image data may include three types of component image data such as visible-light image data, thermal-infrared image data, and short-wave-infrared image data. The data processing module 301 is configured to: determine, based on the visible-light image data, whether the power station component has a surface fault, and when the power station component has a surface fault, determine that the power station component is a faulty component. In addition, the data processing module 301 may be further configured to determine the test temperature or the thermal-infrared area of the power station component based on the thermal-infrared image data, and if the test temperature is greater than a preset temperature threshold or the thermal-infrared area is greater than a threshold area threshold, determine that the power station component has a thermal-infrared fault (e.g., a hot spot). In this case, the data processing module 301 may also be configured to determine a form of the power station component based on the infrared image data, and if the form of the power station component is included in a defect form sample database, determine that the power station component has a target defect. Further, when the power station component is a faulty component, the power station component has a thermal-infrared fault, and the power station component has a target defect, the data processing module 301 is configured to: determine that the power station component is a to-be-operated and maintained component, determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component.

Optionally, the data processing module 301 is further configured to determine, based on the visible-light image data, whether the power station component has a surface fault, and when the power station component does not have a surface fault, determine that the power station component is a normal component. In addition, the data processing module 301 may also be configured to: when detecting that the test temperature of the power station component is less than or equal to the preset temperature threshold, or the component thermal-infrared area is less than or equal to the preset area threshold, determine that the power station component has no thermal-infrared fault. In this case, the data processing module 301 is further configured to: if no target defect form matching the form of the power station component is found in the plurality of defect forms, determine that the form of the power station component is not included in the defect form sample database, to further determine that the power station component has no defect. Further, when the power station component is a normal component, the power station component has no thermal-infrared fault, and the power station component has no defect, the data processing module 301 determines that operation and maintenance do not need to be performed on the power station component, that is, the power station component is a normal component.

In some feasible implementations, the component operation and maintenance parameter of the to-be-operated and maintained component may include but is not limited to at least one of an energy yield loss value and a security risk parameter of the to-be-operated and maintained component. The data processing module 301 is configured to determine, based on an energy yield loss calculation model and/or another model and an algorithm, the energy yield loss value and the security risk parameter of the to-be-operated and maintained component. This may be specifically determined based on an actual application scenario, and is not limited herein. In this application, a model that has a function of calculating the energy yield loss value of the to-be-operated and maintained component may be collectively referred to as an energy yield loss calculation model. It may be understood that the data processing module 301 is configured to input parameters such as a power loss value, local annual utilization hours, and a net price of the to-be-operated and maintained component into the energy yield loss calculation model, and the energy yield loss calculation model outputs the energy yield loss value (e.g., an annual energy yield loss value) of the to-be-operated and maintained component. Optionally, the data processing module 301 is further configured to determine, based on an energy yield that is of the to-be-operated and maintained component and that is recorded by an inverter, the energy yield loss value (e.g., an annual energy yield loss value) of the to-be-operated and maintained component. This is specifically determined based on an actual application scenario, and is not limited herein. Further, the data processing module 301 is further configured to: when the energy yield loss value of the to-be-operated and maintained component is greater than or equal to an energy yield loss threshold, determine that the component operation and maintenance parameter of the to-be-operated and maintained component meets the operation and maintenance condition, and determine the to-be-operated and maintained component as a target operation and maintenance component. The energy yield loss threshold herein may be a manually set value or a factory default value of the power station component (e.g., the to-be-operated and maintained component). Optionally, the data processing module 301 is further configured to: determine spare part replacement costs and manual replacement costs of the to-be-operated and maintained component (e.g., a diode and/or a wiring terminal), determine, based on the annual energy yield loss value, the spare part replacement costs, and the manual replacement costs, a payback period for performing operation and maintenance on a fault of the to-be-operated and maintained component, and determine a target operation and maintenance payback period (e.g., an operation and maintenance payback period expected by a customer), and when the payback period for performing operation and maintenance on the fault of the to-be-operated and maintained component is less than or equal to the target operation and maintenance payback period, determine that the component operation and maintenance parameter of the to-be-operated and maintained component meets the operation and maintenance condition, and determine the to-be-operated and maintained component as a target operation and maintenance component.

In some feasible implementations, the component operation and maintenance parameter of the to-be-operated and maintained component includes the security risk parameter of the to-be-operated and maintained component. The data processing module 301 is further configured to: when the security risk parameter of the to-be-operated and maintained component is greater than or equal to a security risk threshold, determine that the component operation and maintenance parameter of the to-be-operated and maintained component meets the operation and maintenance condition, and determine the to-be-operated and maintained component as a target operation and maintenance component. The security risk threshold herein may be a manually set value or a factory default value of the power station component (e.g., the to-be-operated and maintained component). A specific parameter in the component operation and maintenance parameter of the to-be-operated and maintained component in this application may be determined based on an actual application scenario. This is not limited herein.

In some feasible implementations, the component operation and maintenance parameter of the to-be-operated and maintained component includes the energy yield loss value and the security risk parameter of the to-be-operated and maintained component. The data processing module 301 is further configured to: when the energy yield loss value of the to-be-operated and maintained component is greater than or equal to an energy yield loss threshold, and/or the security risk parameter of the to-be-operated and maintained component is greater than or equal to a security risk threshold, determine that the component operation and maintenance parameter of the to-be-operated and maintained component meets the operation and maintenance condition, and determine the to-be-operated and maintained component as a target operation and maintenance component.

In some feasible implementations, the central controller 30 is further configured to: when determining that the power station component is a target operation and maintenance component, output a component exception alarm. A manner in which the central controller 30 outputs the component exception alarm may include but is not limited to: generating an alarm by using a buzzer (e.g., a piezoelectric buzzer or an electromagnetic buzzer), generating an alarm by using exception prompt information (e.g., an SMS message), and the like. For ease of description, the following is described by using an example in which the manner of outputting the component exception alarm is generating an alarm by using exception prompt information. The central controller 30 may send an exception prompt information alarm to the ground control station. The exception prompt information herein may include related information (such as image data, an exception type, and geographical location data of the target operation and maintenance component) of the target operation and maintenance component. In this case, the operation and maintenance personnel of the power station may further operate and maintain the target operation and maintenance component based on the exception prompt information. This improves operation and maintenance efficiency and power supply reliability, and has higher applicability.

In some feasible implementations, the data processing module (e.g., the data processing module 301) is further configured to: determine an exception type of the target operation and maintenance component, and generate an operation and maintenance report of the target operation and maintenance component based on the exception type and a component operation and maintenance parameter of the target operation and maintenance component. Herein, the exception type of the target operation and maintenance component may include three types, and may specifically include a surface fault type, a thermal-infrared fault type, and a defect type. In this application, an exception type of the faulty component having a surface fault may be referred to as a surface fault type. In this application, an exception type of the power station component having a thermal-infrared fault may also be referred to as a thermal-infrared fault type. In this application, an exception type of the power station component having a defect may also be referred to as a defect type. It may be understood that the operation and maintenance report of the target operation and maintenance component may include but is not limited to geographic location data, a quantity, an exception type, and the like of the target operation and maintenance component. After generating the operation and maintenance report of the target operation and maintenance component, the data processing module 301 may prompt the operation and maintenance personnel of the power station to view the operation and maintenance report of the target operation and maintenance component in a timely manner, so that the operation and maintenance personnel of the power station repair or replace the target operation and maintenance component according to the operation and maintenance report. This improves operation and maintenance efficiency and power supply reliability, and has higher applicability.

In some feasible implementations, the central controller 30 shown in FIG. 2 may further include a wireless network (e.g., wireless fidelity, Wi-Fi) communication module (e.g., a Wi-Fi communication module 302) or a 5th generation mobile communication technology (5th generation mobile networks/5th generation wireless systems/5th-generation, which may be briefly referred to as 5G or a 5G technology) communication module (e.g., a 5G communication module 303). The Wi-Fi communication module 302 or the 5G communication module 303 may be configured to transmit related information (such as image data, an exception type, and geographical location data of the target operation and maintenance component) of the target operation and maintenance component to the ground control station. It may be understood that, when the Wi-Fi communication module 302 transmits the related information of the target operation and maintenance component, an information transmission distance may be increased, so that when the 5G communication module 303 wirelessly transmits the related information of the target operation and maintenance component, information transmission security is improved. After the Wi-Fi communication module 302 or the 5G communication module 303 transmits the related information of the target operation and maintenance component to the ground control station, the operation and maintenance personnel of the power station may repair or replace the target operation and maintenance component based on the related information of the target operation and maintenance component. This improves operation and maintenance efficiency and power supply reliability, and has higher applicability. Optionally, the Wi-Fi communication module 302 or the 5G communication module 303 may also transmit the n types of component image data of the power station component to the ground control station to identify the target operation and maintenance component. The power station inspection system has a downward compatibility capability, and has higher adaptability.

Figure 5:
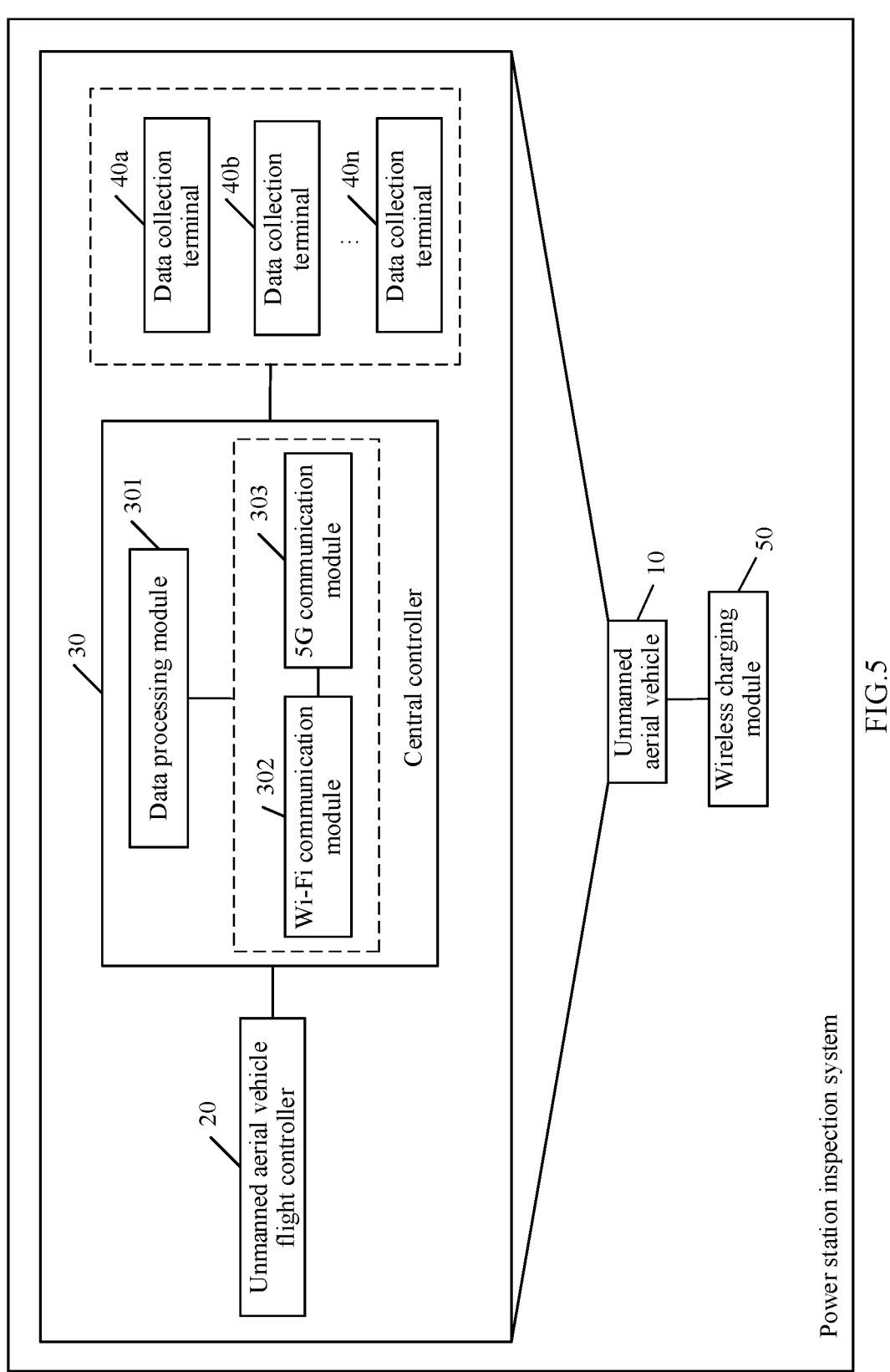
FIG. 5 is a schematic diagram of still another architecture of a power station inspection system according to this application.

FIG. 5 is a schematic diagram of still another architecture of a power station inspection system according to this application. As shown in FIG. 5, in some feasible implementations, the power station inspection system 1 shown in FIG. 2 may further include a wireless charging module (e.g., a wireless charging module 50). The wireless charging module 50 may be configured to wirelessly charge an airborne battery of the unmanned aerial vehicle 10, so that there is no wired charging limitation, to improve a battery life of the unmanned aerial vehicle, and applicability is higher.

In the power station inspection system provided in this application, whether the power station component is a target operation and maintenance component can be quickly determined. This is easy to operate, efficient, and is of high applicability.

FIG. 6 is a schematic flowchart of a power station inspection method according to this application. The power station inspection method provided in this application is applicable to the central controller of the power station inspection system provided in FIG. 2 to FIG. 5. The method includes the following steps.

S101. The central controller obtains, from the at least two types of data collection terminals, at least two types of component image data that are of a power station component and that are collected by the at least two types of data collection terminals in a flight process of the unmanned aerial vehicle.

S102. The central controller determines, based on the at least two types of component image data collected by the at least two types of data collection terminals and a component operation and maintenance parameter of the power station component, whether the power station component is a target operation and maintenance component.

In some feasible implementations, the at least two types of data collection terminals include a visible-light data collection terminal and a thermal-infrared data collection terminal, and the at least two types of component image data include visible-light image data and thermal-infrared image data. The central controller determines, based on the visible-light image data, whether the power station component has a surface fault, and when the power station component has a surface fault, determines that the power station component is a faulty component. In addition, the central controller may also determine a test temperature or a thermal-infrared area of the power station component based on the thermal-infrared image data, and if the test temperature is greater than a preset temperature threshold or the thermal-infrared area is greater than a threshold area threshold, determine that the power station component has a thermal-infrared fault (e.g., a hot spot). Further, when the power station component is a faulty component and the power station component has a thermal-infrared fault, the central controller determines that the power station component is a to-be-operated and maintained component. In this case, the central controller determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

Optionally, the central controller may determine, based on the visible-light image data, whether the power station component has a surface fault, and when the power station component does not have a surface fault, determine that the power station component is a normal component. In addition, when detecting that the test temperature of the power station component is less than or equal to the preset temperature threshold, or the component thermal-infrared area is less than or equal to the preset area threshold, the central controller may determine that the power station component has no thermal-infrared fault. Further, when the power station component is a normal component and the power station component has no thermal-infrared fault, the central controller determines that operation and maintenance do not need to be performed on the power station component, that is, the power station component is a normal component.

In some feasible implementations, the at least two types of data collection terminals include a visible-light data collection terminal and a short-wave-infrared data collection terminal, and the at least two types of component image data include visible-light image data and short-wave-infrared image data. The central controller determines, based on the visible-light image data, whether the power station component has a surface fault, and when the power station component has a surface fault, determines that the power station component is a faulty component. In addition, the central controller may also determine a form of the power station component based on the infrared image data, and if the form of the power station component is included in a defect form sample database, determine that the power station component has a target defect. Further, when the power station component is a faulty component and the power station component has a target defect, the central controller determines that the power station component is a to-be-operated and maintained component. In this case, the central controller determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

Optionally, the central controller may determine, based on the visible-light image data, whether the power station component has a surface fault, and when the power station component does not have a surface fault, determine that the power station component is a normal component. In addition, if no target defect form matching the form of the power station component is found in the plurality of defect forms, the central controller may determine that the form of the power station component is not included in the defect form sample database, to further determine that the power station component has no defect. Further, when the power station component is a normal component and the power station component has no defect, the central controller may determine that operation and maintenance do not need to be performed on the power station component, that is, the power station component is a normal component.

In some feasible implementations, the at least two types of data collection terminals include a thermal-infrared data collection terminal and a short-wave-infrared data collection terminal, and the at least two types of component image data include thermal-infrared image data and short-wave-infrared image data. The central controller may also determine a test temperature or a thermal-infrared area of the power station component based on the thermal-infrared image data, and if the test temperature is greater than a preset temperature threshold or the thermal-infrared area is greater than a threshold area threshold, determine that the power station component has a thermal-infrared fault (e.g., a hot spot). In addition, the central controller may also determine a form of the power station component based on the infrared image data, and if the form of the power station component is included in a defect form sample database, determine that the power station component has a target defect. Further, when the power station component has a thermal-infrared fault and the power station component has a target defect, the central controller determines that the power station component is a to-be-operated and maintained component. In this case, the central controller may determine a component operation and maintenance parameter of the to-be-operated and maintained component, and determine, when the component operation and maintenance parameter of the to-be-operated and maintained component meets an operation and maintenance condition, that the to-be-operated and maintained component is a target operation and maintenance component.

Optionally, the central controller may determine, based on the visible-light image data, whether the power station component has a surface fault, and when the power station component does not have a surface fault, determine that the power station component is a normal component. In addition, if no target defect form matching the form of the power station component is found in the plurality of defect forms, the central controller determines that the form of the power station component is not included in the defect form sample database, to further determine that the power station component has no defect. Further, when the power station component has no thermal-infrared fault and the power station component has no defect, the central controller determines that operation and maintenance do not need to be performed on the power station component, that is, the power station component is a normal component.

In some feasible implementations, the at least two types of data collection terminals include a visible-light data collection terminal, a thermal-infrared data collection terminal, and a short-wave-infrared data collection terminal, and the at least two types of component image data include visible-light component image data, thermal-infrared image data, and short-wave-infrared image data. The central controller determines, based on the visible-light image data, whether the power station component has a surface fault, and when the power station component has a surface fault, determines that the power station component is a faulty component. In addition, the central controller may further determine a test temperature or a thermal-infrared area of the power station component based on the thermal-infrared image data, and if the test temperature is greater than a preset temperature threshold or the thermal-infrared area is greater than a threshold area threshold, determine that the power station component has a thermal-infrared fault (e.g., a hot spot). In addition, the central controller may also determine a form of the power station component based on the infrared image data, and if the form of the power station component is included in a defect form sample database, determine that the power station component has a target defect. Further, when the power station component is a faulty component, the power station has a thermal-infrared fault, and the power station component has a target defect, the central controller determines that the power station component is a to-be-operated and maintained component. In this case, the central controller determines a component operation and maintenance parameter of the to-be-operated and maintained component, and determines, when the component operation and maintenance parameter of the to-be-operated and maintained component meets an operation and maintenance condition, that the to-be-operated and maintained component is a target operation and maintenance component.

Optionally, the central controller may determine, based on the visible-light image data, whether the power station component has a surface fault, and when the power station component does not have a surface fault, determine that the power station component is a normal component. In addition, when detecting that the test temperature of the power station component is less than or equal to the preset temperature threshold, or the component thermal-infrared area is less than or equal to the preset area threshold, the central controller determines that the power station component has no thermal-infrared fault. In addition, if no target defect form matching the form of the power station component is found in the plurality of defect forms, the central controller determines that the form of the power station component is not included in the defect form sample database, to further determine that the power station component has no defect. Further, when the power station component is a normal component, the power station component has no thermal-infrared fault, and the power station component has no defect, the central controller determines that operation and maintenance do not need to be performed on the power station component, that is, the power station component is a normal component.

In some feasible implementations, the component operation and maintenance parameter of the to-be-operated and maintained component includes at least one of an energy yield loss value and a security risk parameter of the to-be-operated and maintained component. The central controller may determine the energy yield loss value and/or the security risk parameter of the to-be-operated and maintained component based on an energy yield loss calculation model and/or in another manner. When the component operation and maintenance parameter of the to-be-operated and maintained component includes the energy yield loss value of the to-be-operated and maintained component, and the energy yield loss value of the to-be-operated and maintained component is greater than or equal to an energy yield loss threshold, the central controller may determine that the component operation and maintenance parameter of the to-be-operated and maintained component meets the operation and maintenance condition, and determine the to-be-operated and maintained component as a target operation and maintenance component. When the component operation and maintenance parameter of the to-be-operated and maintained component includes the security risk parameter of the to-be-operated and maintained component, and the security risk parameter of the to-be-operated and maintained component is greater than or equal to a security risk threshold, the central controller may determine that the component operation and maintenance parameter of the to-be-operated and maintained component meets the operation and maintenance condition, and determine the to-be-operated and maintained component as a target operation and maintenance component.

In some feasible implementations, the central controller determines an exception type of the target operation and maintenance component, and generates an operation and maintenance report of the target operation and maintenance component based on the exception type and a component operation and maintenance parameter of the target operation and maintenance component. Herein, the exception type of the target operation and maintenance component may include three types, and may specifically include a surface fault type, a thermal-infrared fault type, and a defect type. In this application, an exception type of the faulty component having a surface fault may be referred to as a surface fault type. In this application, an exception type of the power station component having a thermal-infrared fault may also be referred to as a thermal-infrared fault type. In this application, a type of the power station component having a defect may also be referred to as a defect type. It may be understood that the operation and maintenance report of the target operation and maintenance component may include but is not limited to geographic location data, a quantity, an exception type, and the like of the target operation and maintenance component. After generating the operation and maintenance report of the target operation and maintenance component, the central controller may prompt the operation and maintenance personnel of the power station to view the operation and maintenance report of the target operation and maintenance component in a timely manner, so that the operation and maintenance personnel of the power station repair or replace the target operation and maintenance component according to the operation and maintenance report. This improves operation and maintenance efficiency and power supply reliability, and has higher applicability.

In some feasible implementations, when determining that the power station component is a target operation and maintenance component, the central controller outputs a component exception alarm. A manner in which the central controller outputs the component exception alarm may include but is not limited to: generating an alarm by using a buzzer (e.g., a piezoelectric buzzer or an electromagnetic buzzer), generating an alarm by using exception prompt information (e.g., an SMS message), and the like. For ease of description, the following is described by using an example in which the manner of outputting the component exception alarm is exception prompt information. The central controller may send an exception prompt information alarm to the ground control station. The exception prompt information herein may include related information (such as image data, an exception type, and geographical location data of the target operation and maintenance component) of the target operation and maintenance component. In this case, the operation and maintenance personnel of the power station may further operate and maintain the target operation and maintenance component based on the exception prompt information. This improves operation and maintenance efficiency and power supply reliability, and has higher applicability.

In specific implementation, for more operations performed by the central controller in the power station inspection method provided in this application, refer to the power station inspection system shown in FIG. 2 to FIG. 5 and the implementations performed by the central controller in the working principles of the power station inspection system. Details are not described herein again.

In this application, collaborative image data analysis can be performed on the at least two types of component image data of the power station component, to quickly determine, based on the component operation and maintenance parameter of the power station component, whether the power station component is a target operation and maintenance component. This improves system flexibility, is easy to operate, has high operation and maintenance efficiency, and has higher applicability.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power station inspection system comprising:
an unmanned aerial vehicle;
an unmanned aerial vehicle flight controller;
a central controller; and
at least two types of data collection terminals that are disposed on the unmanned aerial vehicle,
wherein the central controller is configured to instruct the unmanned aerial vehicle flight controller so that the unmanned aerial vehicle flight controller controls flight of the unmanned aerial vehicle,
wherein the central controller is further configured to instruct the at least two types of data collection terminals to collect at least two types of component image data of a power station component during a flight of the unmanned aerial vehicle, and
wherein the central controller is further configured to determine, based on the at least two types of component image data collected by the at least two types of data collection terminals and a component operation and maintenance parameter of the power station component, the power station component is a target operation and maintenance component,
wherein the central controller comprises a data processing module that is configured to determine, based on the at least two types of component image data collected by the at least two types of data collection terminals and the component operation and maintenance parameter of the power station component, the power station component is the target operation and maintenance component, and wherein the power station inspection system further comprises at least one data collection and processing arrangement taken from the group of three additional data collection and processing arrangements consisting of:

(1) wherein the at least two types of data collection terminals comprise:
  a visible-light data collection terminal; and
  a short-wave-infrared data collection terminal;
wherein the at least two types of component image data comprise:
  visible-light image data collected by the visible-light data collection terminal, and
  short-wave-infrared image data collected by the short-wave-infrared data collection terminal; and
wherein the central controller is configured to:
  determine that the power station component is a to-be-operated and maintained component in accordance with:
    determining, based on the visible-light image data, that the power station component is a faulty component, and
    determining, based on the short-wave-infrared image data, that a form of the power station component is comprised in a defect form sample database;
  determine a component operation and maintenance parameter of the to-be-operated and maintained component, and
  determine, in accordance with the component operation and maintenance parameter of the to-be-operated and maintained component meeting an operation and maintenance condition, that the to-be-operated and maintained component is the target operation and maintenance component;
(2) wherein the at least two types of data collection terminals comprise:
  a thermal-infrared data collection terminal, and
  a short-wave-infrared data collection terminal;
wherein the at least two types of component image data comprise:
  thermal-infrared image data collected by the thermal-infrared data collection terminal; and
  short-wave-infrared image data collected by the short-wave-infrared data collection terminal; and
wherein the central controller is configured to:
  determine that the power station component is the to-be-operated and maintained component in accordance with:
    determining, based on the thermal-infrared image data, that a test temperature of the power station component is greater than a preset temperature threshold or a component thermal-infrared area is greater than a preset area threshold, and
    determining, based on the short-wave-infrared image data, that a form of the power station component is comprised in a defect form sample database;
  determine the component operation and maintenance parameter of the to-be-operated and maintained component, and
  determine, in accordance with the component operation and maintenance parameter of the to-be-operated and maintained component meeting an operation and maintenance condition, that the to-be-operated and maintained component is the target operation and maintenance component; and (3) wherein the at least two types of data collection terminals comprise:
  a visible-light data collection terminal,
  a thermal-infrared data collection terminal; and
  a short-wave-infrared data collection terminal;
wherein the at least two types of component image data comprise:
  visible-light component image data collected by the visible-light data collection terminal,
  thermal-infrared image data collected by the thermal-infrared data collection terminal, and
  short-wave-infrared image data collected by the short-wave-infrared data collection terminal; and
wherein the central controller is configured to:
  determine that the power station component is the to-be-operated and maintained component in accordance with:
    determining, based on the visible-light image data, that the power station component is the faulty component,
    determining, based on the thermal-infrared image data, that a test temperature of the power station component is greater than a preset temperature threshold or a component thermal-infrared area is greater than a preset area threshold, and
    determining, based on the short-wave-infrared image data, that a form of the power station component is comprised in a defect form sample database;
  determine the component operation and maintenance parameter of the to-be-operated and maintained component, and
  determine, in accordance with the component operation and maintenance parameter of the to-be-operated and maintained component meets an operation and maintenance condition, that the to-be-operated and maintained component is the target operation and maintenance component.

2. The power station inspection system according to claim 1, wherein the component operation and maintenance parameter of the to-be-operated and maintained component comprises at least one of the group consisting of:
  an energy yield loss value of the to-be-operated and maintained component, and
  a security risk parameter of the to-be-operated and maintained component.

3. The power station inspection system according to claim 2, wherein the component operation and maintenance parameter of the to-be-operated and maintained component comprises the energy yield loss value of the to-be-operated and maintained component; and
  the central controller is further configured to: determine, in accordance with the energy yield loss value of the to-be-operated and maintained component is greater than or equal to an energy yield loss threshold, that the component operation and maintenance parameter of the to-be-operated and maintained component meets the operation and maintenance condition, and determine the to-be-operated and maintained component as the target operation and maintenance component.

4. The power station inspection system according to claim 2, wherein the component operation and maintenance parameter of the to-be-operated and maintained component comprises the security risk parameter of the to-be-operated and maintained component; and
  wherein the central controller is further configured to: in accordance with the security risk parameter of the to-be-operated and maintained component is greater than or equal to a security risk threshold, determine that the component operation and maintenance parameter of the to-be-operated and maintained component meets the operation and maintenance condition, and determine the to-be-operated and maintained component as the target operation and maintenance component.

5. The power station inspection system according to claim 1, wherein the central controller is further configured to:

determine an exception type of the target operation and maintenance component, and generate an operation and maintenance report of the target operation and maintenance component based on the exception type and a component operation and maintenance parameter of the target operation and maintenance component.

6. The power station inspection system according to claim 1, wherein the central controller further comprises a wireless network communication module or a 5th generation mobile communication technology 5G communication module.

7. The power station inspection system according to claim 1, wherein the central controller is configured to perform independent parallel communication with each data collection terminal in the at least two types of data collection terminals through a parallel communication interface.

8. A power station inspection method applicable to a central controller in a power station inspection system, wherein the method comprises:

obtaining, from at least two types of data collection terminals, at least two types of component image data that are of a power station component and that are collected by the at least two types of data collection terminals during a flight of an unmanned aerial vehicle; and determining, based on the at least two types of component image data collected by the at least two types of data collection terminals and a component operation and maintenance parameter of the power station component, the power station component is a target operation and maintenance component, wherein the central controller comprises a data processing module that is configured to determine, based on the at least two types of component image data collected by the at least two types of data collection terminals and the component operation and maintenance parameter of the power station component, the power station component is the target operation and maintenance component, and wherein the power station inspection system further comprises at least one data collection and processing arrangement taken from the group of three additional data collection and processing arrangements consisting of:

(1) wherein the at least two types of data collection terminals comprise:

a visible-light data collection terminal; and a short-wave-infrared data collection terminal;

wherein the at least two types of component image data comprise:

visible-light image data collected by the visible-light data collection terminal, and short-wave-infrared image data collected by the short-wave-infrared data collection terminal; and wherein the central controller is configured to:

determine that the power station component is a to-be-operated and maintained component in accordance with:

determining, based on the visible-light image data, that the power station component is a faulty component, and determining, based on the short-wave-infrared image data, that a form of the power station component is comprised in a defect form sample database;

determine a component operation and maintenance parameter of the to-be-operated and maintained component, and determine, in accordance with the component operation and maintenance parameter of the to-be-operated and maintained component meeting an operation and maintenance condition, that the to-be-operated and maintained component is the target operation and maintenance component;

(2) wherein the at least two types of data collection terminals comprise:

a thermal-infrared data collection terminal, and a short-wave-infrared data collection terminal;

wherein the at least two types of component image data comprise:

thermal-infrared image data collected by the thermal-infrared data collection terminal; and short-wave-infrared image data collected by the short-wave-infrared data collection terminal; and wherein the central controller is configured to:

determine that the power station component is the to-be-operated and maintained component in accordance with:

determining, based on the thermal-infrared image data, that a test temperature of the power station component is greater than a preset temperature threshold or a component thermal-infrared area is greater than a preset area threshold, and determining, based on the short-wave-infrared image data, that a form of the power station component is comprised in a defect form sample database;

determine a component operation and maintenance parameter of the to-be-operated and maintained component, and determine, in accordance with the component operation and maintenance parameter of the to-be-operated and maintained component meeting an operation and maintenance condition, that the to-be-operated and maintained component is the target operation and maintenance component; and (3) wherein the at least two types of data collection terminals comprise:

a visible-light data collection terminal, a thermal-infrared data collection terminal; and a short-wave-infrared data collection terminal;

wherein the at least two types of component image data comprise:

visible-light component image data collected by the visible-light data collection terminal, thermal-infrared image data collected by the thermal-infrared data collection terminal, and short-wave-infrared image data collected by the short-wave-infrared data collection terminal; and wherein the central controller is configured to:

determine that the power station component is the to-be-operated and maintained component in accordance with:

determining, based on the visible-light image data, that the power station component is the faulty component, determining, based on the thermal-infrared image data, that a test temperature of the power station component is greater than a preset temperature threshold or a component thermal-infrared area is greater than a preset area threshold, and determining, based on the short-wave-infrared image data, that a form of the power station component is comprised in a defect form sample database;

determine the component operation and maintenance parameter of the to-be-operated and maintained component, and determine, in accordance with the component operation and maintenance parameter of the to-be-operated and maintained component meets an operation and maintenance condition, that the to-be-operated and maintained component is the target operation and maintenance component.

9. The power station inspection method according to claim 8, wherein the component operation and maintenance parameter of the to-be-operated and maintained component comprises at least one of the group consisting of:

an energy yield loss value of the to-be-operated and maintained component, and a security risk parameter of the to-be-operated and maintained component.

10. The power station inspection method according to claim 9, wherein the component operation and maintenance parameter of the to-be-operated and maintained component comprises the energy yield loss value of the to-be-operated and maintained component; and wherein the determining that the to-be-operated and maintained component is the target operation and maintenance component comprises:

determining, in accordance with the energy yield loss value of the to-be-operated and maintained component being greater than or equal to an energy yield loss threshold, that the component operation and maintenance parameter of the to-be-operated and maintained component meets the operation and maintenance condition, and determining the to-be-operated and maintained component as the target operation and maintenance component.

11. The power station inspection method according to claim 9, wherein the component operation and maintenance parameter of the to-be-operated and maintained component comprises the security risk parameter of the to-be-operated and maintained component; and wherein the determining that the to-be-operated and maintained component is the target operation and maintenance component comprises:

determining, in accordance with the security risk parameter of the to-be-operated and maintained component being greater than or equal to a security risk threshold, that the component operation and maintenance parameter of the to-be-operated and maintained component meets the operation and maintenance condition, and determining the to-be-operated and maintained component as the target operation and maintenance component.

12. The power station inspection method according to claim 8, wherein the method comprises:

determining an exception type of the target operation and maintenance component, and generating an operation and maintenance report of the target operation and maintenance component based on the exception type and a component operation and maintenance parameter of the target operation and maintenance component.

13. The power station inspection method according to claim 8, wherein the central controller further comprises a wireless network communication module or a 5th generation mobile communication technology 5G communication module.

14. The power station inspection method according to claim 8, wherein the central controller is configured to perform, during the obtaining at least two types of component image data, independent parallel communication with each data collection terminal in the at least two types of data collection terminals through a parallel communication interface.

* * * * *